US007338143B2

(12) United States Patent
Onishi et al.

(10) Patent No.: US 7,338,143 B2
(45) Date of Patent: Mar. 4, 2008

(54) INK JET RECORDING APPARATUS AND RECORDING METHOD OF THE RECORDING APPARATUS

(75) Inventors: Hiroyuki Onishi, Nagano (JP); Katsumori Takei, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 515 days.

(21) Appl. No.: 10/492,478

(22) PCT Filed: Oct. 15, 2002

(86) PCT No.: PCT/JP02/10696

§ 371 (c)(1), (2), (4) Date: Oct. 18, 2004

(87) PCT Pub. No.: WO03/043825

PCT Pub. Date: May 30, 2003

(65) Prior Publication Data

US 2005/0243121 A1 Nov. 3, 2005

(30) Foreign Application Priority Data

Oct. 12, 2001 (JP) ............................ 2001-316017

(51) Int. Cl.
*B41J 29/393* (2006.01)
*G06K 15/00* (2006.01)

(52) U.S. Cl. ............................ 347/19; 347/5; 347/101; 358/1.15; 358/1.13

(58) Field of Classification Search .................. 347/95, 347/100, 101, 96, 14, 5, 16, 19, 21, 15, 2; 358/1.13, 1.15
See application file for complete search history.

(56) References Cited

U.S. PATENT DOCUMENTS

| | | | | |
|---|---|---|---|---|
| 6,181,434 | B1 * | 1/2001 | Matsumoto | ................ 358/1.13 |
| 6,788,427 | B1 * | 9/2004 | Okigami | .................... 358/1.15 |

FOREIGN PATENT DOCUMENTS

| | | | |
|---|---|---|---|
| JP | 3-92351 | A | 4/1991 |
| JP | 10-329316 | A | 12/1998 |
| JP | 2000-238415 | A | 9/2000 |
| JP | 2001-001509 | * | 1/2001 |
| JP | 2001-1509 | A | 1/2001 |
| JP | 2001-213044 | A | 8/2001 |
| JP | 2001-226615 | A | 8/2001 |
| JP | 2001-239660 | A | 9/2001 |
| JP | 2001-240819 | A | 9/2001 |

* cited by examiner

*Primary Examiner*—Manish S. Shah
(74) *Attorney, Agent, or Firm*—Sughrue Mion, PLLC

(57) ABSTRACT

An ink jet recording apparatus of the invention includes (1) a precoater for applying a coat of a pretreatment, (2) an ejector for ejecting the ink, (3) an overcoater for at least depositing a posttreatment on the ink, (4) a recorder recording print modes corresponding to the types of recording medium, (5) a selector for selecting one of the print modes from the recorder based on the type of the recording medium, and (6) a drive controller for controlling the operation of the precoater, the ejector, and the overcoater based on the selection result.

22 Claims, 11 Drawing Sheets

FIG. 9

| PRINT MODE | PRECOATER | EJECTOR | OVERCOATER |
| --- | --- | --- | --- |
| RECORDING MEDIUM HAVING NO COAT LAYER | ○ | ○ | |
| | ○ | ○ | ○ |
| RECORDING MEDIUM HAVING COAT LAYER | ○ | ○ | |
| | ○ | ○ | ○ |
| | | ○ | |
| | | ○ | ○ |
| RECORDING MEDIUM WITH IMAGE FORMED | | | ○ |

FIG. 11

| PRINT MODE | APPLIED RECORDING MEDIUM | | PRECOATER | EJECTOR | OVERCOATER |
|---|---|---|---|---|---|
| | COAT LAYER | INKJET SUITABILITY | | | |
| A | NONE | NONE | OFF | DYE INK | OFF |
| B | NONE | NONE | OFF | PIGMENT INK | ON |
| C | NONE | NONE | ON*1 | PIGMENT INK | OFF |
| D | NONE | NONE | ON*1 | PIGMENT INK | ON |
| E | INCLUDED | NONE | ON*2 | PIGMENT INK | OFF |
| F | INCLUDED | NONE | ON*2 | PIGMENT INK | ON |
| G | INCLUDED | INCLUDED | OFF | PIGMENT INK*3 | OFF |
| H | INCLUDED | INCLUDED | OFF | DYE INK | OFF |
| I | INCLUDED | INCLUDED | OFF | DYE INK | ON |
| J | INCLUDED | INCLUDED | OFF | PIGMENT INK | ON |

*1) PRETREATMENT APPLICATION AMOUNT 2g/m$^2$ OR MORE

*2) PRETREATMENT APPLICATION AMOUNT 0.3 TO 3g/m$^2$ OR MORE

*3) DYE INK MAY BE USED

INK JET RECORDING APPARATUS AND RECORDING METHOD OF THE RECORDING APPARATUS

TECHNICAL FIELD

This invention relates to an ink jet recording apparatus for ejecting ink for recording an image and more particularly to an ink jet recording apparatus and a recording method of the apparatus for applying a treatment and/or ink for recording in response to the type of recording medium.

BACKGROUND ART

The ink jet record technique is a technique for giving ejection energy to ink using mechanical energy of piezoelectric elements, etc., or heat energy of heating elements and ejecting ink droplets from a recording head and depositing the ink droplets on a recording medium for forming dots for recording. In recent years, the record technique has become increasingly widespread because it has the features of providing a sharp record image, a low noise level of a drive, easy colorization, etc.

As recording media for using the record mode to form an image containing text for recording, recording media provided with no ink reception layer and having no coat layer, such as plain paper and bond paper, recording media having a coat layer, or a coat layer having such as a glossy layer and a mat layer, on a substrate such as paper and a film, and the like are known. In recent years, recording of a sharp full-color image at higher resolution and can-stability of the recorded image have been desired for the record media.

JP-A-63-299970 and JP-A-64-9279 disclose each an ink jet recording method of depositing some type of liquid before depositing ink on a recording medium for the purpose of good fixing of ink. However, there is a problem of lacking in the can-stability of an image recorded by the recording method.

JP-A-8-104000 discloses a method of performing optimum treatment in response to the type of record material such as a transparent sheet for OHP and improving image quality. In the method, a method of using print property improvement liquid and adjusting the optimum amount of the print property improvement liquid in response to the ambient temperature and humidity environments is adopted. The image quality of a record provided by the method is improved, but the method also involves a problem of lacking in the can-stability of an image.

JP-A-10-226055 discloses an ink jet recording apparatus and recording method based on ejection amount control of treatment liquid before and after ink ejection for the purpose of improving the record quality. However, treatment liquid cannot be selected for different recording media and applicable recording media are limited.

Recording media having a coat layer or having no coat layer are mainly used as recording media, but the recording media having a coat layer are available in a wide range from those for ink jet record to those for offset print.

It is therefore an object of the invention to provide a recording apparatus and a recording method for making it possible to select pretreatment, inkjet record, posttreatment and execute any desired record for all recording media including a recording medium having no coat layer and a recording medium having a coat layer in a single ink jet recording apparatus.

DISCLOSURE OF THE INVENTION

The object is accomplished by an ink jet recording apparatus for ejecting ink onto a recording medium, including (1) a precoater for applying a coat of a pretreatment; (2) an ejector for ejecting the ink; (3) an overcoater for at least depositing a posttreatment on the ink; (4) a recorder recording print modes corresponding to the types of recording medium; (5) a selector for selecting one of the print modes from the recorder based on the type of the recording medium; and (6) a drive controller for controlling the operation of the precoater, the ejector, and the overcoater based on the selection result.

According to a preferred form of the invention, the recording apparatus is characterized in that the types of recording medium include a recording medium having a coat layer and a recording medium having no coat layer.

According to a preferred form of the invention, the recording apparatus is characterized in that the precoater is a head or a spray for ejecting liquid or a roller for applying a coat of liquid.

According to a preferred form of the invention, the recording apparatus is characterized in that the overcoater is selected from the group consisting of a head or a spray for ejecting liquid, a spreader roller for applying a coat of liquid, a pressure roller for pressing and bonding a transparent film, and a thermal head or a heat roller for thermally transferring a transfer layer previously formed on a support.

According to a preferred form of the invention, the recording apparatus is characterized in that if an image is previously formed on the recording medium, the drive controller controls the operation of the overcoater so as to deposit a posttreatment.

According to a preferred form of the invention, the recording apparatus is characterized in that it further includes a heater for heating and drying the pretreatment, the ink, and the posttreatment in a single step or a plurality of steps as required after the pretreatment, the ink, and the posttreatment are applied onto or deposited on the recording medium.

According to a preferred form of the invention, the recording apparatus is characterized in that the color material of the ink is pigment ink including at least four colors of yellow, magenta, cyan, and black.

According to a preferred form of the invention, the recording apparatus is characterized in that the pretreatment is an ink reception layer formation material or a material for flocculating the pigment ink.

According to a preferred form of the invention, the recording apparatus is characterized in that it includes a signal receiver for receiving record characteristic information concerning various record characteristics of image quality, preservability, gloss, etc., required for a record, wherein the selector references the record characteristic information received by the signal receiver and selects an appropriate print mode from the recorder based on the type of the recording medium to be used.

According to a preferred form of the invention, the recording apparatus is characterized in that the following print modes are recorded in the recorder:

1. First print mode (hereinafter also called print mode A): A coat of the pretreatment is not applied and dye ink is ejected for recording and the posttreatment is not used;

2. Second print mode (hereinafter also called print mode B): A coat of the pretreatment is not applied and pigment ink is ejected for recording and further the posttreatment is deposited on the record portion;

3. Third print mode (hereinafter also called print mode C): A coat of the pretreatment is applied 2 $g/m^2$ or more in solid content terms and then pigment ink is ejected for recording and the posttreatment is not used; 4. Fourth print mode (hereinafter also called print mode D): A coat of the pretreatment is applied 2 $g/m^2$ or more in solid content terms and then pigment ink is ejected for recording and further the posttreatment is deposited on the record portion;

5. Fifth print mode (hereinafter also called print mode E): A coat of the pretreatment is applied 0.3 to 3 $g/m^2$ in solid content terms and then pigment ink is ejected for recording and the posttreatment is not used;

6. Sixth print mode (hereinafter also called print mode F): A coat of the pretreatment is applied 0.3 to 3 $g/m^2$ in solid content terms and then pigment ink is ejected for recording and further the posttreatment is deposited on the record portion;

7. Seventh print mode (hereinafter also called print mode G or H): A coat of the pretreatment is not applied and dye ink or pigment ink is ejected for recording and the posttreatment is not used;

8. Eighth print mode (hereinafter also called print mode I or J): A coat of the pretreatment is not applied and dye ink or pigment ink is ejected for recording and further the posttreatment is deposited on the record portion.

According to a preferred form of the invention, the recording apparatus is characterized in that if the recording medium is a recording medium having no coat layer, the selector selects any of the first, second, third, or fourth print mode and if the recording medium is a recording medium having a coat layer, the selector selects any of the fifth, sixth, seventh, or eighth print mode.

According to a preferred form of the invention, the recording apparatus is characterized in that if the recording medium is a recording medium having no coat layer, the selector selects any of the first, second, third, or fourth print mode according to [1] to [3] described below:

[1] if the record characteristic information contains a print command requesting high image quality, selecting the third or fourth print mode; if the record characteristic information does not contain the print command, selecting the first or second print mode;

[2] in the third and fourth print modes, if the record characteristic information contains a print command requesting high preservability, selecting the fourth print mode;

[3] in the first and second print modes, if the record characteristic information contains a print command requesting high preservability, selecting the second print mode.

According to a preferred form of the invention, the recording apparatus is characterized in that if the recording medium is a recording medium having a coat layer, the selector selects any of the fifth, sixth, seventh, or eighth print mode according to [4] to [8] described below:

[4] if the recording medium is ink jet recording paper, selecting the seventh or eighth print mode; if the recording medium is not ink jet recording paper, selecting the fifth or sixth print mode;

[5] in the seventh and eighth print modes, if the record characteristic information contains a print command requesting high preservability, selecting the eighth print mode;

[6] in the fifth and sixth print modes, if the record characteristic information contains a print command requesting high preservability, selecting the sixth print mode;

[7] when the seventh print mode is selected, if the record characteristic information contains a print command requesting high image quality, ejecting dye ink for recording;

[8] when the eighth print mode is selected, if the record characteristic information contains a print command requesting high image quality, ejecting pigment ink for recording.

The object is accomplished by a recording method of an ink jet recording apparatus for ejecting ink onto a recording medium, including a precoater for applying a coat of a pretreatment, an ejector for ejecting ink, an overcoater for at least depositing a posttreatment on the ink, and a controller for controlling the operation of the precoater, the ejector, and the overcoater, the recording method including (1) the step of receiving a characteristic signal corresponding to the type of recording medium; (2) the step of selecting which of the pretreatment, the ink, and the posttreatment is to be applied or deposited based on the signal; and (3) the step of controlling so as to apply or deposit any of the pretreatment, the ink, or the posttreatment onto or on the recording medium in response to the selection result.

According to a preferred form of the invention, the recording method is characterized in that the types of recording medium include a recording medium having a coat layer and a recording medium having no coat layer.

According to a preferred form of the invention, the recording method is characterized in that the precoater is a head or a spray for ejecting liquid or a roller for applying a coat of liquid.

According to a preferred form of the invention, the recording method is characterized in that the overcoater is selected from the group consisting of a head or a spray for ejecting liquid, a spreader roller for applying a coat of liquid, a pressure roller for pressing and bonding a transparent film, and a thermal head or a heat roller for thermally transferring a transfer layer previously formed on a support.

According to a preferred form of the invention, the recording method is characterized in that if an image is previously formed on the recording medium, a posttreatment is deposited in the step (3).

According to a preferred form of the invention, the recording method is characterized in that it further includes the heating step of heating and drying the pretreatment, the ink, and the posttreatment in a single step or a plurality of steps as required after the pretreatment, the ink, and the posttreatment are applied onto or deposited on the recording medium.

According to a preferred form of the invention, the recording method is characterized in that the color material of the ink is pigment ink including at least four colors of yellow, magenta, cyan, and black.

According to a preferred form of the invention, the recording method is characterized in that the pretreatment is an ink reception layer formation material or a material for flocculating the pigment ink.

According to a preferred form of the invention, the recording method is characterized in that if a characteristic signal indicating that the recording medium is a recording medium having no coat layer is received in the step (1), the steps (2) and (3) are executed according to any of print modes 1 to 4 described below, and if a characteristic signal indicating that the recording medium is a recording medium having a coat layer is received in the step (1), the steps (2) and (3) are executed according to any of print modes 5 to 8 described below:

1. First print mode: A coat of the pretreatment is not applied and dye ink is ejected for recording and the posttreatment is not used;

2. Second print mode: A coat of the pretreatment is not applied and pigment ink is ejected for recording and further the posttreatment is deposited on the record portion;

3. Third print mode: A coat of the pretreatment is applied 2 g/$m^2$ or more in solid content terms and then pigment ink is ejected for recording and the posttreatment is not used;

4. Fourth print mode: A coat of the pretreatment is applied 2 g/$m^2$ or more in solid content terms and then pigment ink is ejected for recording and further the posttreatment is deposited on the record portion;

5. Fifth print mode: A coat of the pretreatment is applied 0.3 to 3 g/$m^2$ in solid content terms and then pigment ink is ejected for recording and the posttreatment is not used;

6. Sixth print mode: A coat of the pretreatment is applied 0.3 to 3 g/$m^2$ in solid content terms and then pigment ink is ejected for recording and further the posttreatment is deposited on the record portion;

7. Seventh print mode: A coat of the pretreatment is not applied and dye ink or pigment ink is ejected for recording and the posttreatment is not used;

8. Eighth print mode: A coat of the pretreatment is not applied and dye ink or pigment ink is ejected for recording and further the posttreatment is deposited on the record portion.

According to a preferred form of the invention, the recording method is characterized in that if a characteristic signal indicating that the recording medium is a recording medium having no coat layer is received in the step (1), the steps (2) and (3) are executed according to [1] to [3] described below:

[1] if a request for a record of high image quality is made, selecting the third or fourth print mode; if a request for a record of high image quality is not made, selecting the first or second print mode;

[2] in the third and fourth print modes, if a request for a record of high preservability is made, selecting the fourth print mode;

[3] in the first and second print modes, if a request for a record of high preservability is made, selecting the second print mode.

According to a preferred form of the invention, the recording method is characterized in that if a characteristic signal indicating that the recording medium is a recording medium having a coat layer is received in the step (1), the steps (2) and (3) are executed according to [4] to [8] described below:

[4] if the recording medium is ink jet recording paper, selecting the seventh or eighth print mode; if the recording medium is not ink jet recording paper, selecting the fifth or sixth print mode;

[5] in the seventh and eighth print modes, if a request for a record of high preservability is made, selecting the eighth print mode;

[6] in the fifth and sixth print modes, if a request for a record of high preservability is made, selecting the sixth print mode;

[7] when the seventh print mode is selected, if a request for a record of high image quality is made, ejecting the dye ink for recording;

[8] when the eighth print mode is selected, if a request for a record of high image quality is made, ejecting the pigment ink for recording.

Further, the object is accomplished by an ink jet record provided by the recording method described above.

The treatments used in the invention are materials applied onto or deposited on a recording medium and refer to liquid and a film having any desired nature and are made up of a pretreatment and a posttreatment. The pretreatment refers to a treatment applied onto a recording medium before ink is ejected. The posttreatment refers to a treatment deposited on the recording medium after ink is ejected, and includes liquid and a film.

The term "transfer layer previously formed on support" used in the invention means a layer which becomes transparent after thermal transfer.

As described above, recording media each having a coat layer used in the invention (hereinafter also called coated paper) refer to recording media each having an ink reception layer, a glossy layer, and a mat layer placed on a substrate and include coated paper for ink jet record, coated paper for any other than ink jet record, such as coated paper for offset print, and film-based recording media. Ink jet recording paper used in the invention is coated paper provided with an ink reception layer having ink jet suitability and is roughly classified into so-called absorption type and swelling type according to the ink reception layer difference. The absorption-type ink jet recording paper generally has an ink reception layer consisting essentially of white pigment of silica gel, alumina, etc., and binder resin of polyvinyl alcohol, etc. The swelling-type ink jet recording paper generally has an ink reception layer consisting essentially of water soluble resin of carboxymethyl cellulose, gelatin, etc. Further, a recording medium having no coat layer used in the invention (hereinafter also called plain paper) refers to a recording medium having no ink reception layer, no glossy layer, and no mat layer placed on a substrate. As specific examples of the recording medium having no coat layer, general print paper used for offset print, gravure print, etc., can be named and PPC, woodfree paper, wood containing paper, and the like are included.

BRIEF DESCRIPTION OF THE DRAWINGS

FIG. 9 is a schematic representation of a print mode table according to an embodiment of the invention, wherein operated devices are operated in order from left to right and each circle indicates the device to be operated, FIG. 11 is a schematic representation of a print mode table according to still another embodiment of the invention.

BEST MODE FOR CARRYING OUT THE INVENTION

Embodiments of the invention will be discussed in detail with reference to the accompanying drawings, but the invention is not limited to the embodiments.

Figure 1:
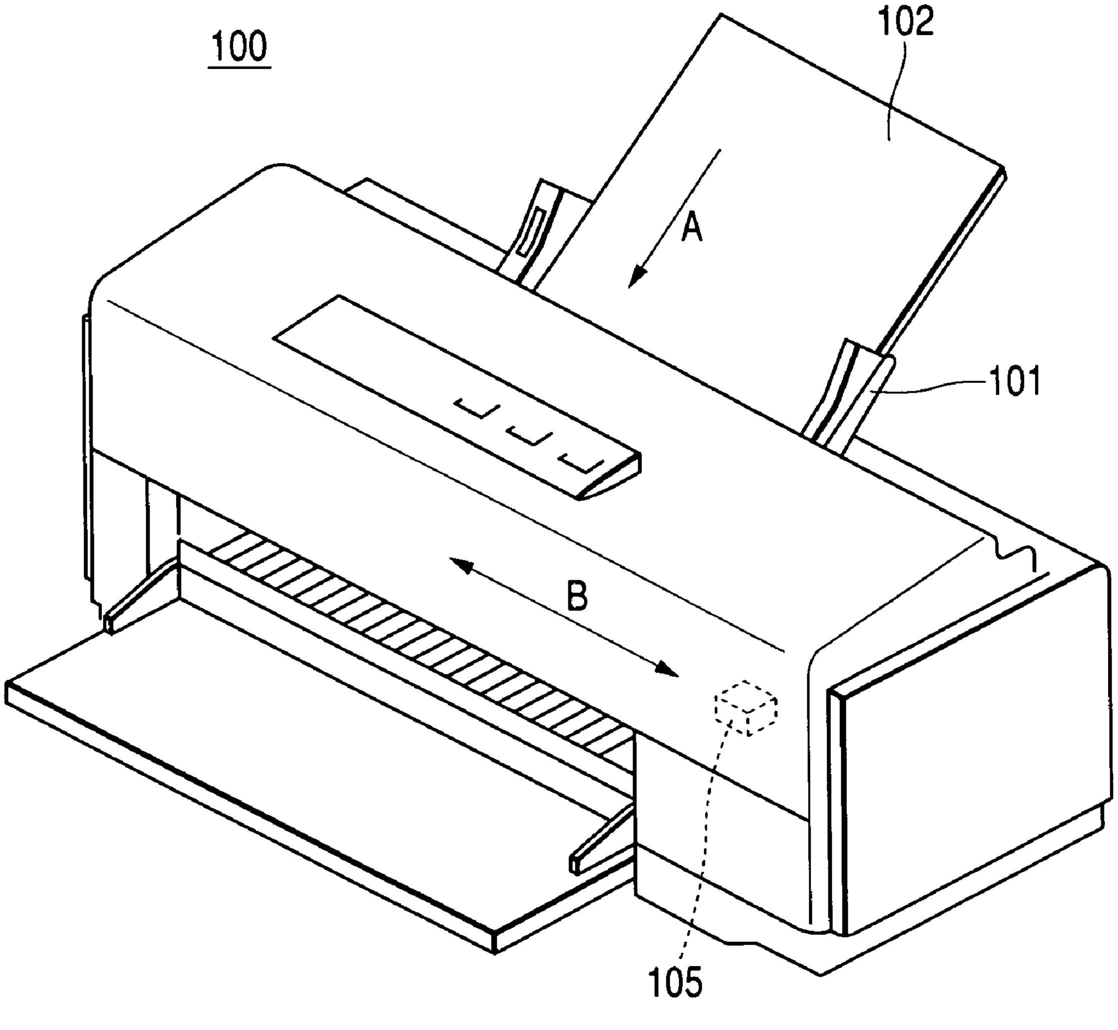
FIG. 1 is a perspective view of an ink jet recording apparatus 100 that can incorporate the invention.

FIG. 1 is a perspective view of an ink jet recording apparatus 100 that can incorporate the invention. The ink jet recording apparatus 100 transports a recording medium 102 inserted into a tray 101 in the arrow A direction shown in FIG. 1 by a feedroller (not shown). A schematically shown recording head 105 can move in the arrow B direction in a recordable area of the recording medium 102. A platen (200 in FIG. 2) is placed below the recording medium 102 in the recordable area.

Figure 2:
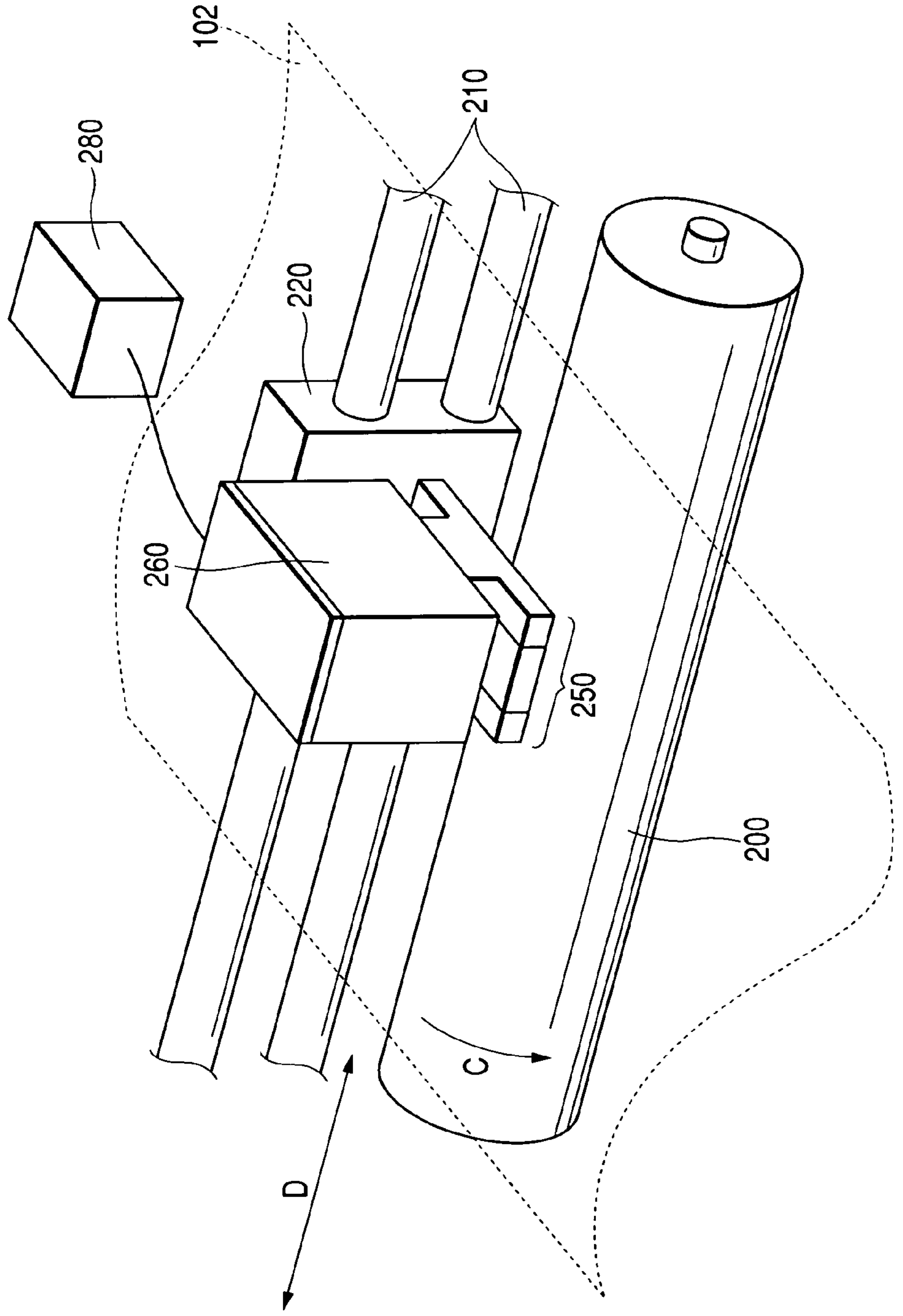
FIG. 2 is a drawing to show one embodiment of ink jet recording apparatus according to the invention.

FIG. 2 is a drawing to show one embodiment of ink jet recording apparatus according to the invention. The apparatus has a carriage 220 for reciprocating in the arrow D direction on guide shafts 210 along the platen 200 of a recording medium transporter for rotating in the arrow C direction to transport a recording medium. A recording head 250 used preferably in the invention is mounted on the carriage 220 so as to be close to the platen 200.

One embodiment of the recording head 250 to which the invention is applied is made up of a precoater 253 for applying a coating of pretreatment liquid, an ink print head 251 of ejector for ejecting ink, and an overcoater 255 for depositing posttreatment liquid.

Preferably, the precoater 253 and overcoater 255 and the print head 251 use electromechanical transducing elements for transducing electric energy into mechanical energy as the crystalline structure is distorted by applying voltage to piezoelectric elements, give ejection energy to ink or treatment liquid, and eject ink or treatment liquid droplets on a recording medium in dot form from the recording head 250. A description is given below using a head for ejecting liquid using electromechanical transducing elements as precoater and overcoater for treatment liquid of a treatment preferred for the invention.

However, the precoater 253 and the overcoater 255 used for the invention are not limited to the head using electromechanical transducing elements and, for example, may be a head using an electrostatic force generator of an electrode, etc., or maybe a head using an electrothermal energy conversion element of a heater, etc. The head using an electrothermal energy conversion element generates gas (bubbles) in liquid by the electrothermal energy conversion element and ejects the liquid by the force; for example, a bubble jet (registered trademark) head manufactured by Canon can be named.

A treatment liquid and ink tank 260 is placed above the recording head 250. Treatment liquid and ink are supplied from the tank to the recording head 250. The recording head 250 used in the invention is connected to a control section 280 for controlling the operation of the recording head. The control section 280 may be implemented in the ink jet recording apparatus 100 or may be implemented in a personal computer connected to the recording apparatus 100 or may be implemented in both the recording apparatus and the personal computer.

Figure 3:
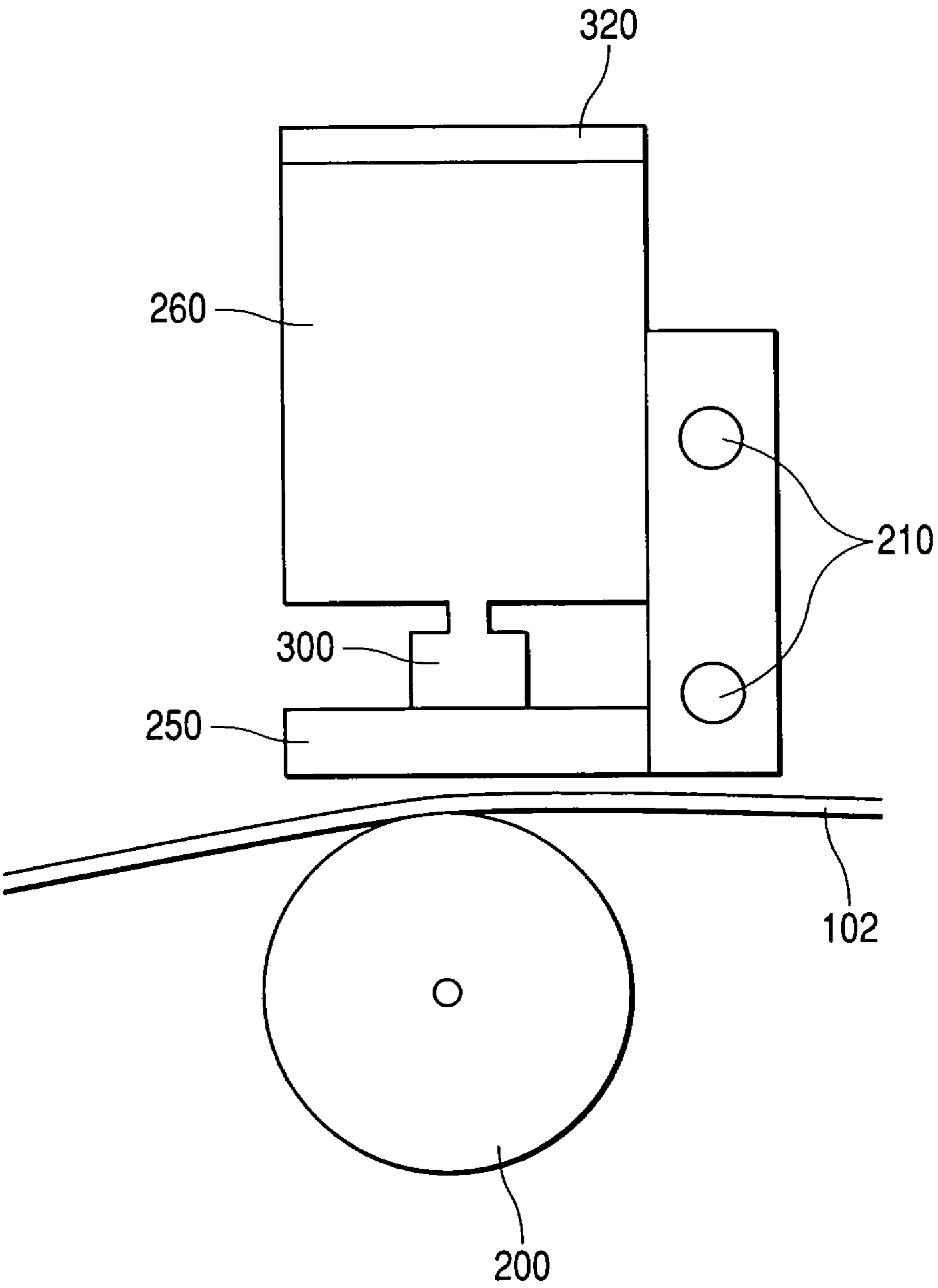
FIG. 3 is a sectional view of a part of the ink jet recording apparatus according to the invention shown in FIG. 2, FIGS. 4A and 4B are enlarged schematic drawings of recording head 250 according to the invention.

FIG. 3 is a sectional view of a part of the ink jet recording apparatus according to the invention shown in FIG. 2. The tank 260 communicating with the recording head 250 through a filter chamber 300 is placed above the recording head 250, and a lid 320 is disposed on the tank 260.

Figure 4A:
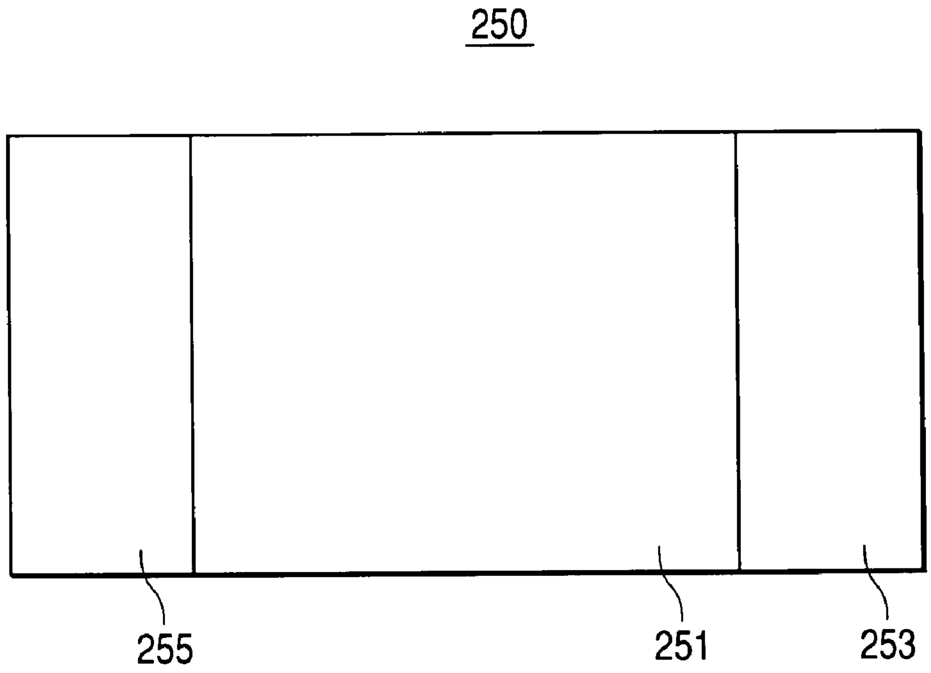
FIG. 4A is a schematic drawing of the configuration wherein pretreatment head 253, ink print head 251, and posttreatment head 255 are formed in one piece
Figure 4B:
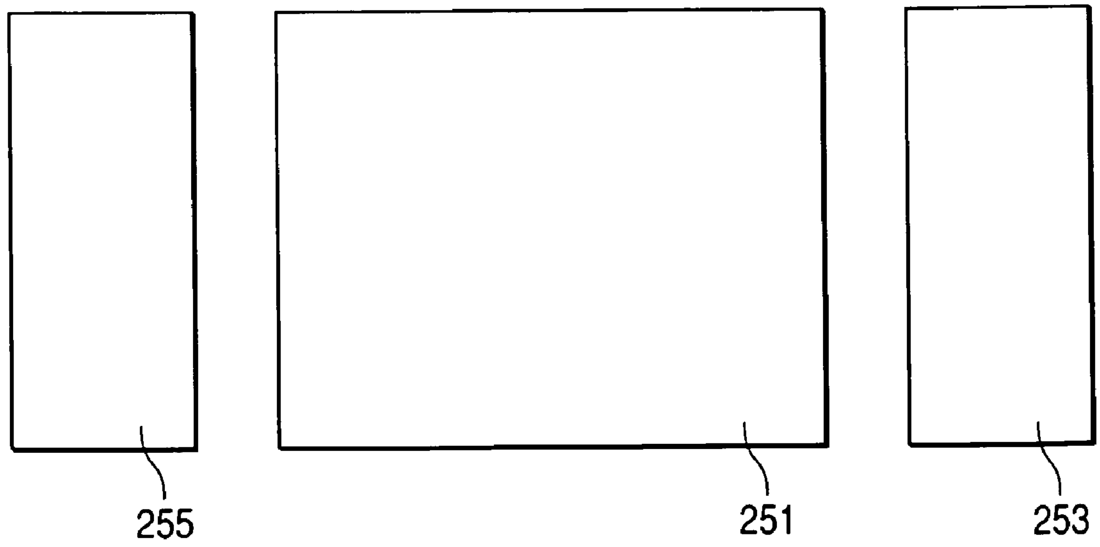
FIG. 4B is a schematic drawing of the configuration wherein pretreatment head 253, ink print head 251, and posttreatment head 255 are formed separately.

FIGS. 4A and 4B are schematic front views of the recording head 250 of the preferred embodiment of the invention. The recording head 250 shown in FIG. 4A includes ink print head 251 and a treatment liquid head in one piece, and the treatment liquid head is made up of pretreatment liquid head 253 and posttreatment liquid head 255. FIG. 4B shows another embodiment of the recording head 250 that can be used for the invention, and ink print head 251, pretreatment liquid head 253, and posttreatment liquid head 255 are formed separately. The pretreatment liquid head 253 and the posttreatment liquid head 255 are heads corresponding to pretreatment liquid and posttreatment liquid respectively and the treatment liquids are stored in the tank 260 corresponding to the heads 253 and 255.

In the recording head 250 shown in FIG. 4A, the pretreatment liquid, ink, and posttreatment liquid can be applied or deposited consecutively in this order in conjunction with motion of the recording head 250, as described later. In the recording head 250 shown in FIG. 4B, the pretreatment liquid head 253, the ink print head 251, and the posttreatment liquid head 255 can be operated separately.

Figure 5:
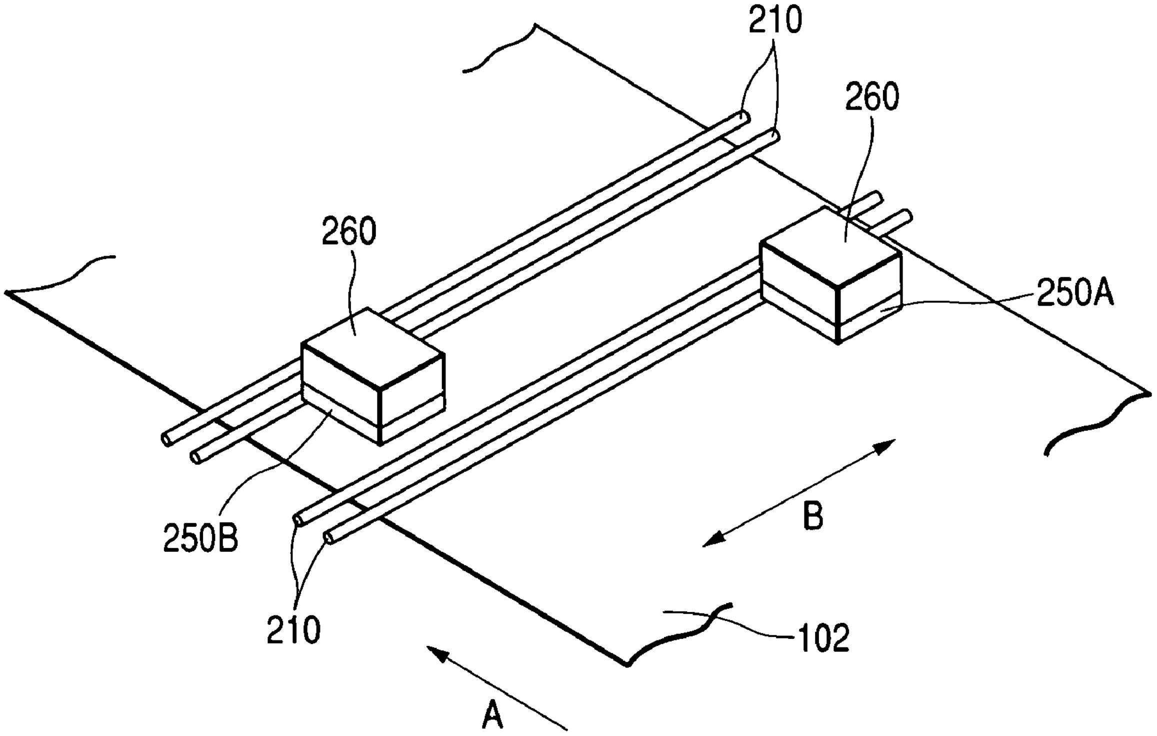
FIG. 5 is a perspective view to show a schematic configuration of another embodiment of ink jet recording apparatus according to the invention.

FIG. 5 is a perspective view to show a schematic configuration of another embodiment of ink jet recording apparatus according to the invention. This ink jet recording apparatus has a similar configuration to that of the ink jet recording apparatus shown in FIG. 2 except that it includes two recording heads (250A and 250B) each of a similar configuration to that of the recording head 250. The ink jet recording apparatus is also provided with two tanks 260, two pairs of guide shafts 210, two platens (not shown), etc., for example, as components required for each recording head. Such a recording apparatus of so-called twin head type would facilitate proper use of dye ink and pigment ink. For example, the recording head 250A can be used as a head for ejecting dye ink and pretreatment liquid and/or posttreatment liquid and the recording head 250B can be used as a head for ejecting pigment ink and pretreatment liquid and/or posttreatment liquid; the dye ink and pigment ink may be replaced with each other.

The pretreatment liquid used in the invention is used 1) for the purpose of forming an ink reception layer suited for ink jet record and 2) for the purpose of flocculating pigment if pigment ink is used, but the purpose of the pretreatment liquid are not limited to them. The pretreatment liquid is ejected onto a recording medium before ink is ejected, and provides the change effect for the better, of bleeding of later ejected ink (ink and ink boundary bleeding) and can enhance the ink absorbency, increase the print density, and drastically improve color reproducibility.

As specific examples of the pretreatment liquid used in the invention, pretreatment liquid containing usual ink reception layer formation pigment, for example, silica, alumina, binder resin component, organic or inorganic cation component, sole or mixed solution of thermoplastic resin emulsion, cationic polymer compound or polyvalent metal salt for flocculating pigment of color material in ink can be used.

The following water-soluble cationic polymers are preferred as specific cationic polymer compounds; dicyandiamide/diethylenetriamine-based polymer, dicyandiamide/formalin-based polymer, methacrylate quaternary ammonium salt based polymer, dimethylamine/ammonia/epichlorohydrin-based polymer, diallyl dimethyl ammonium salt based polymer, diallyl dimethyl ammonium salt/acrylamaide-based polymer, diallyl amine/epichlorohydrin-based polymer, diallyl amine salt/acrylamaide-based polymer, diallyl amine salt/acrylic acid/acrylamaide-based polymer, etc., can be used:

[Chemical formula 1]

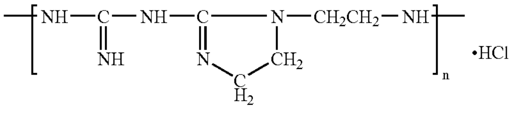

Dicyandiamide/diethylenetriamine-based polymer

[Chemical formula 2]

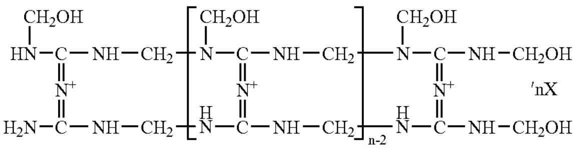

Dicyandiamide/formalin-based polymer

[Chemical formula 3]

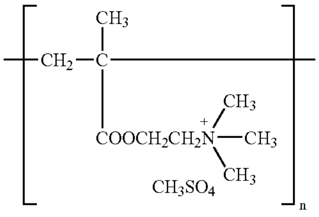

Methacrylate quaternary ammonium salt based polymer

[Chemical formula 4]

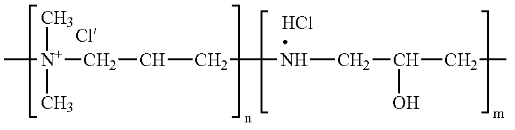

Dimethylamine/ammonia/epichlorohydrin-based polymer

[Chemical formula 5]

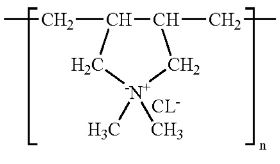

Diallyl dimethyl ammonium salt based polymer

[Chemical formula 6]

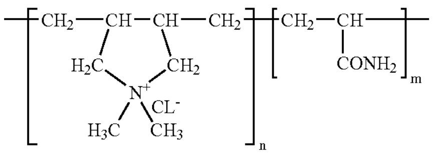

Diallyl dimethyl ammonium salt/acrylamaide-based polymer

[Chemical formula 7]

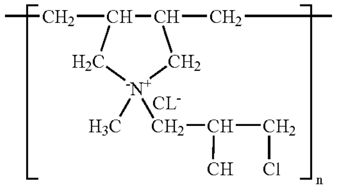

Diallyl amine/epichlorohydrin-based polymer

[Chemical formula 8]

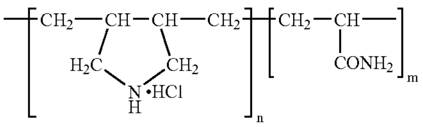

Diallyl amine salt/acrylamaide-based polymer

[Chemical formula 9]

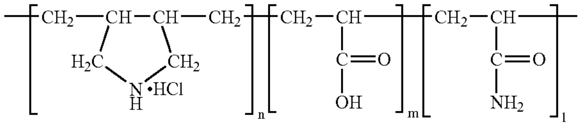

Diallyl amine salt/acrylic acid/acrylamaide-based polymer

Specific polyvalent metal salt, a magnesium compound, an aluminum compound, a calcium compound, and a sodium compound can be named.

The posttreatment used in the invention is liquid or a film; after ink is ejected to a recording medium, the posttreatment is deposited on the recording medium for use. Posttreatment (overcoat) using such a treatment is performed, whereby a coating for covering the color material of dye, pigment, etc., deposited on the recording medium is formed and external exposure of the color material is prevented, so that a gloss can be given to the formed image and the can-stability of the formed image (resistance to water, resistance to light, resistance to gas, resistance to friction, etc.,) can be enhanced. It is also possible to appropriately adjust the face quality of a record depending on the type of coating; for example, a uniform and dense coating is formed, whereby a high gloss can be given; in contrast, the coated surface is made adequately rough in a specific pattern, whereby diversified appearances of a mat tone, a semi-glossy tone, etc., can be given.

As the posttreatment liquid of liquid as the posttreatment used in the invention, a sole or mixed solution of inorganic pigment water-soluble resin, oil-soluble resin, thermoplastic resin emulsion, colloidal silica, etc., can be named.

As the posttreatment used in the invention, a transfer layer previously formed on a transparent film or a support and thermally transferred, for example, thermoplastic resin, etc., can be named.

Figure 6:
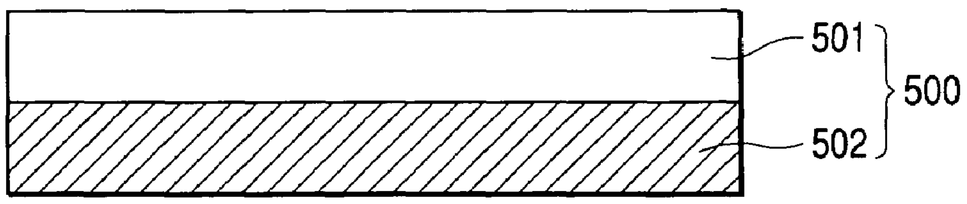
FIG. 6 is a schematic sectional view of one embodiment of a thermal transfer film that can be used as a posttreatment in the invention.

FIG. 6 is a schematic sectional view of one embodiment of a thermal transfer film that can be used as a posttreatment in the invention. This thermal transfer film 500 is made up of a support 501 and a transfer layer 502 stripably formed on the support 501. As the support 501, a film of polyethylene terephthalate (PET), etc., can be used, for example. As the formation material of the transfer layer 502, thermoplastic resin of an acrylic copolymer, an acryl-styrene copolymer, etc., can be used. The thickness of the transfer layer 502 is not limited, but usually is about 2 to 50 μm.

Figure 7:
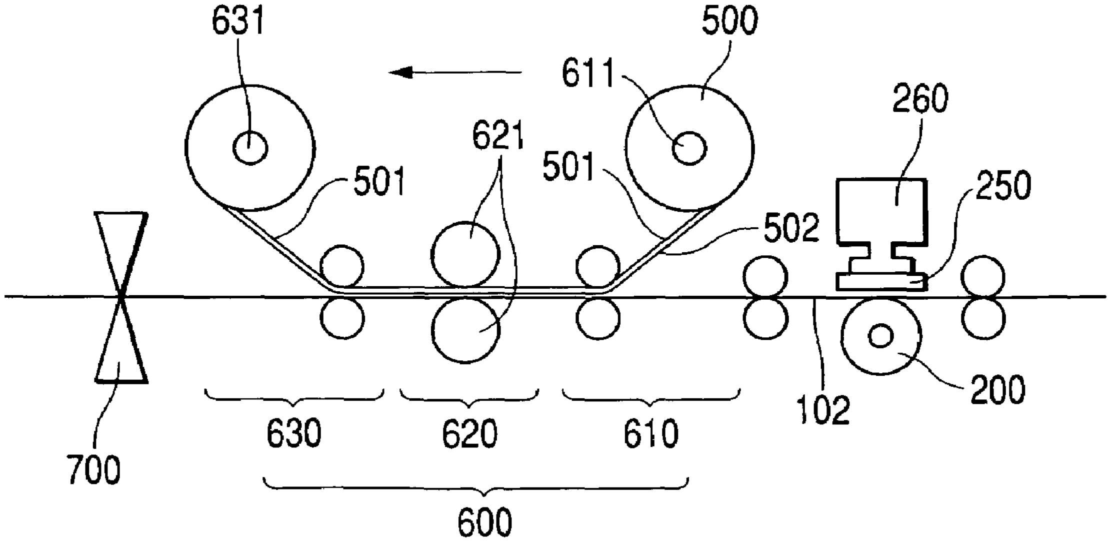
FIG. 7 is a side view to schematically show the main part of another embodiment of ink jet recording apparatus according to the invention.

FIG. 7 is a side view to schematically show the main part of another embodiment of ink jet recording apparatus according to the invention. This ink jet recording apparatus has a thermal transfer unit 600 and a cutter 700 as overcoater placed in order behind the recording head 250 of the ink jet recording apparatus shown in FIG. 2 (downstream in the transport direction of the recording medium 102 relative to the recording head 250 ); other components are similar to those shown in FIG. 2.

The thermal transfer unit 600 executes thermal transfer of the transfer layer 502 previously formed on the support 501 onto the recording medium 102, and includes a film supplier 610 for supplying the thermal transfer film 500, a thermocompression bonding performer 620 for heating and bonding the transfer layer 502 onto the recording medium 102, and a peeler 630 for peeling the support 501 after heating and bonding.

Overcoat treatment of the thermal transfer unit 600 will be discussed. First, the film supplier 610 deposits the thermal transfer film 500 wound around a film shaft 611 on the recording medium 102 so as to oppose the transfer layer 502 to the recording medium 102. Next, the thermal transfer film deposited on the recording medium is passed through nip between a pair of heat rolls 621 and 621 of the thermocompression bonding performer 620 at a predetermined temperature under a predetermined linear pressure for pressing and bonding the transfer layer 502 onto the recording medium 102. The support 501 is peeled from the pressed and bonded substance by a winding roll 631 of the peeler 630. The overcoat treatment is now complete.

After the overcoat treatment is performed, the cutter 700 is operated for cutting the thermal transfer film 500 unpressed and unbonded onto the recording medium 102 or the pressed and bonded substance (the pressed and bonded substance of the recording medium 102 and the thermal transfer film 500) at any desired position such as the termination part of one unit of image print area (quality assurance area of printed matter), whereby an ink jet record already subjected to the posttreatment like a cut sheet can be provided.

Preferably, a color record is formed using the ink used in the invention and any other ink composition in combination. According to a preferred form of the invention, it is desirable that black (Bk) ink and other color inks (for example, yellow (Y) ink, magenta (M) ink, cyan (C) ink) should be used in combination.

To embody the invention, ink to be used is not limited to dye ink and pigment ink with pigment dispersed can also be used.

The pigment ink is water based ink having pigment-based color material contained in water; usually, it further contains various organic solvents, surfactant, etc., for moisture retention, osmotic regulation, etc. The pigment-based color material may be so-called self-dispersion type pigment (also called surface modification pigment, etc.,) that can be dispersed and/or is soluble in an aqueous medium to which no or a very little amount of a dispersant of a surfactant, etc., is added or may be a normal pigment which is not of self-dispersion type. The content of the pigment-based color material in ink is appropriately adjusted considering the characteristics, etc., required for the ink and usually is about 0.5 to 30 wt %.

Particularly, according to a preferred form of the invention, to use pigment inks of four colors of yellow, magenta, cyan, and black as color material of ink, an image with high color development with no bleeding can be provided by the pretreatment liquid head 253 of precoater, and it is easily made possible to give a gloss and enhance resistance to friction by the posttreatment liquid head 255 of overcoater.

Figure 8:
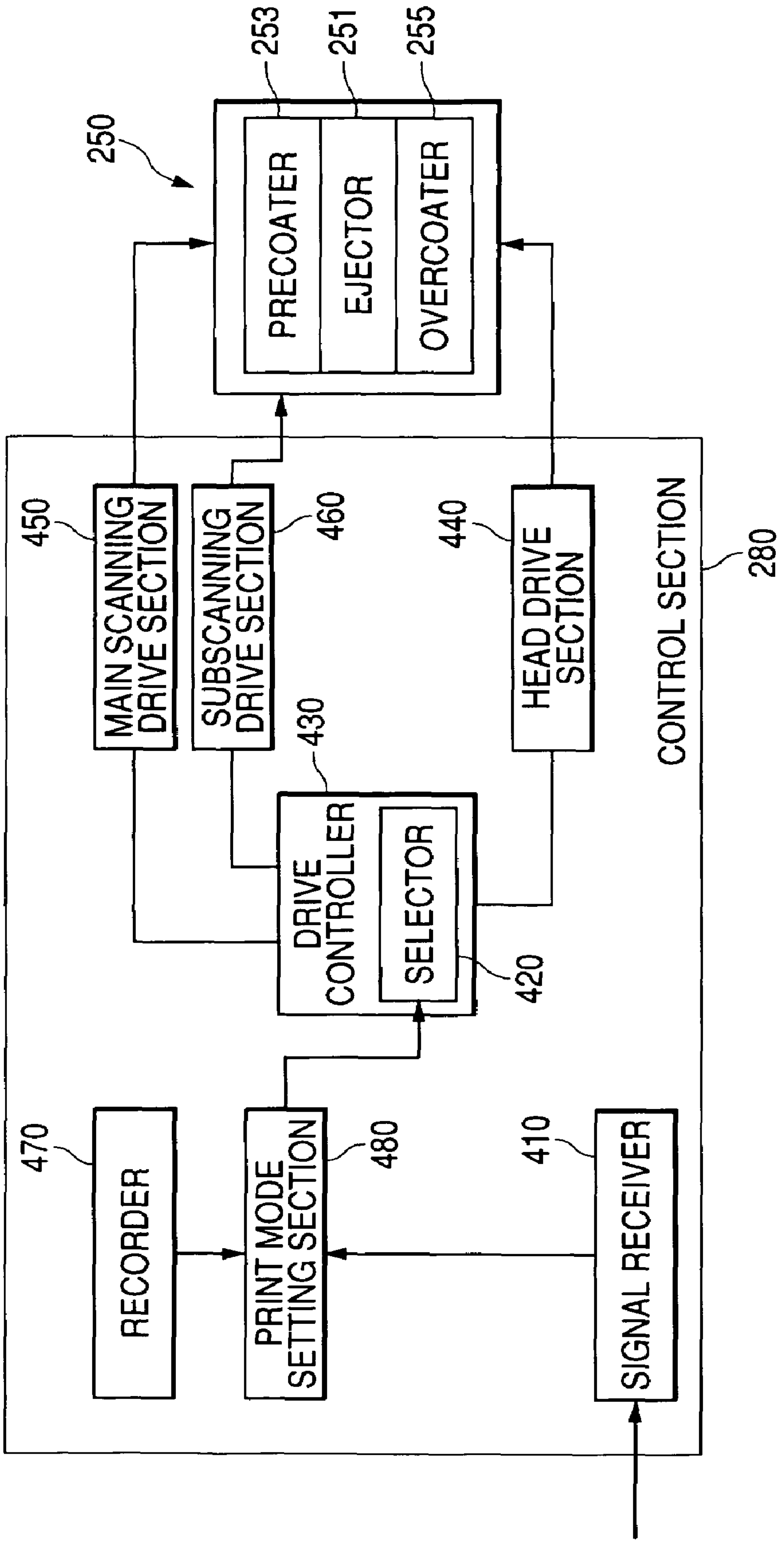
FIG. 8 is a functional block diagram to show the configuration of an ink jet recording apparatus according to the invention.

Next, control of the recording head of ink jet recording apparatus corresponding to the type of recording medium, one feature of the invention, will be discussed. FIG. 8 is a functional block diagram to show the configuration of ink jet recording apparatus according to the invention.

Ink jet recording apparatus 100 of the invention is made up of at least a recording head 250 and a control section 280 for controlling the operation of the recording head 250. The recording head 250 includes a pretreatment liquid head 253 as precoater, a posttreatment liquid head 255 as overcoater, and an ink print head 251 as ejector. Further, the control section 280 is made up of a signal receiver 410 and a drive controller 430, which controls the operation of the recording head 250 through a head drive section 440, a main scanning drive section 450, and a subscanning drive section 460.

The signal receiver 410 receives a characteristic signal based on the characteristic as to whether the recording medium is a recording medium having a coat layer or a recording medium having no coat layer. The characteristic signal corresponding to a recording medium having a coat layer or a recording medium having no coat layer is transmitted to the means 410 as the user sets a print mode described later or by a detector (not shown) separately placed in the ink jet recording apparatus 100. Based on the characteristic signal, a selector 420 existing in the drive controller 430 selects the pretreatment liquid or posttreatment liquid head 253 or 255 or the inkprint head 251 making up the recording head 250 through a print mode setting section 480 described later.

Specifically, when the signal receiver 410 receives the characteristic signal of a recording medium having no coat layer, two print modes on the recording medium are available. A print mode table is previously registered in a recorder 470, and the print mode is set in the print mode setting section 480 from the characteristic signal and the recorder 470.

FIG. 9 specifically shows the previously registered print modes, which are described later in detail. In the first print mode for the recording medium having no coat layer, the selector 420 selects the pretreatment liquid head 253 as precoater and the head drive section 440 operates the pretreatment liquid head 253 so as to eject pretreatment liquid onto the recording medium having no coat layer. After this, the head drive section 440 operates the ink print head 251 so as to eject ink onto the recording medium having no coat layer. In this case, the pretreatment liquid is ejected onto the full face of the recording medium having no coat layer or is ejected selectively onto the later ink ejection portion. Before later ink injection, the pretreatment liquid deposited on the recording medium having no coat layer can be dried by a heater not shown in FIG. 2. As a specific example of the heater, treatment of a hot wind, infrared radiation, etc., is preferred; particularly a heater is preferred.

In the second print mode for the recording medium having no coat layer, after the ink ejection in the first print mode, the selector 420 further selects the posttreatment liquid head 255 and the head drive section 440 operates the posttreatment liquid head 255 so as to eject posttreatment liquid onto the recording medium having no coat layer. After this, the head drive section 440 operates the ink print head 251 so as to eject ink onto the recording medium having no coat layer. In this case, the posttreatment liquid is ejected onto the full face of the recording medium having no coat layer or is ejected selectively onto the ink ejection portion. The ink and/or posttreatment liquid can be dried by the heater after ink ejection and/or after posttreatment liquid ejection.

Next, when the signal receiver 410 receives the characteristic signal based on a recording medium having a coat layer, four print modes on the recording medium having a coat layer are available (see FIG. 9). As the coat layer of the recording medium having a coat layer, in addition to a coat layer for ink jet record, any other coat layer (for example, for offset print, color laser printer, etc.,) also exists.

Thus, preferably a sole or mixed solution of cationic polymeric substance or polyvalent metal compound is used as the pretreatment liquid for the recording medium having any other coat layer than a coat layer for ink jet record; particularly, preferably a layer containing polyvalent metal is formed for any other coat layer than a coat layer for ink jet record. Thus, in the first and second print modes on the recording medium having a coat layer, the pretreatment liquid head 253, the ink print head 251, and the posttreatment liquid head 255 are operated as with the recording medium having no coat layer.

In the third print mode on the recording medium having a coat layer, based on a signal of the print mode setting section 480, the selector 420 selects the ink print head 251 rather than the pretreatment head 253 and the head drive section 440 operates the ink head 251 so as to eject ink onto the recording medium having a coat layer.

Further, in the fourth print mode on the recording medium having a coat layer, after the ink ejection, the head drive section 440 operates the posttreatment liquid head 255 so as to eject posttreatment liquid onto the recording medium having a coat layer. In this case, the posttreatment liquid is ejected onto the full face of the recording medium having a coat layer or is ejected selectively onto the ink ejection portion. The ink and/or posttreatment liquid can be dried by the heater after ink ejection and/or after posttreatment liquid ejection.

Further, as another print mode, the control drive means 430 can also control the operation of the posttreatment liquid head 255 so as to eject posttreatment liquid onto the recording medium having a record with an ink jet image already formed (regardless of the recording medium having a coat layer or the recording medium having no coat layer).

To sum up, with the ink jet recording apparatus 100 according to the invention, two print modes of one for ejecting pretreatment liquid and ink and one for further ejecting posttreatment liquid can be used for the recording medium having no coat layer, further two print modes of one for rejecting ink and one for further ejecting posttreatment liquid in addition to two print modes similar to those for the recording medium having no coat layer can be used for the recording medium having a coat layer, the recording medium having a coat layer not intended for ink jet print, and further a print mode for ejecting posttreatment liquid can be used for the recording medium with an ink jet image already formed, but the invention is not limited to the print modes and the treatment liquid or ink head can be appropriately selected in response to the type of recording medium for performing proper treatment of treatment liquid or ink on the recording medium.

The operation relationship between the control drive means 430 and the recording head 250 according to the invention has been described. The print modes described above are already registered in the ink jet recording apparatus of the invention and as the user sets, the control section 280 receives the characteristic signal corresponding to the type of recording medium through the print mode setting section 480 and controls the operation of the recording head 250 as described above.

The drive control of the recording head 250 corresponding to the print mode will be discussed. The above-described signal receiver 410 is connected to the recorder 470 having the print mode table and the print mode setting section 480. The recorder 470 contains the print mode table shown in FIG. 9, which is recorded in the control section 280. In the table, the operation of the pretreatment liquid head 253 as precoater, the ink print head 251 as ejector, and the posttreatment liquid head 255 as overcoater, and the like are registered in response 20 to the type of recording medium, as illustrated in FIG. 9.

As the user sets, the print mode setting section 460 determines the print mode from the characteristic signal supplied through the signal receiver 410 and reads the print mode parameters corresponding to the print mode table placed in the recorder 470. The print mode parameters include parameters required for dot record, such as the heads to be operated and the head operation order.

Figure 10:
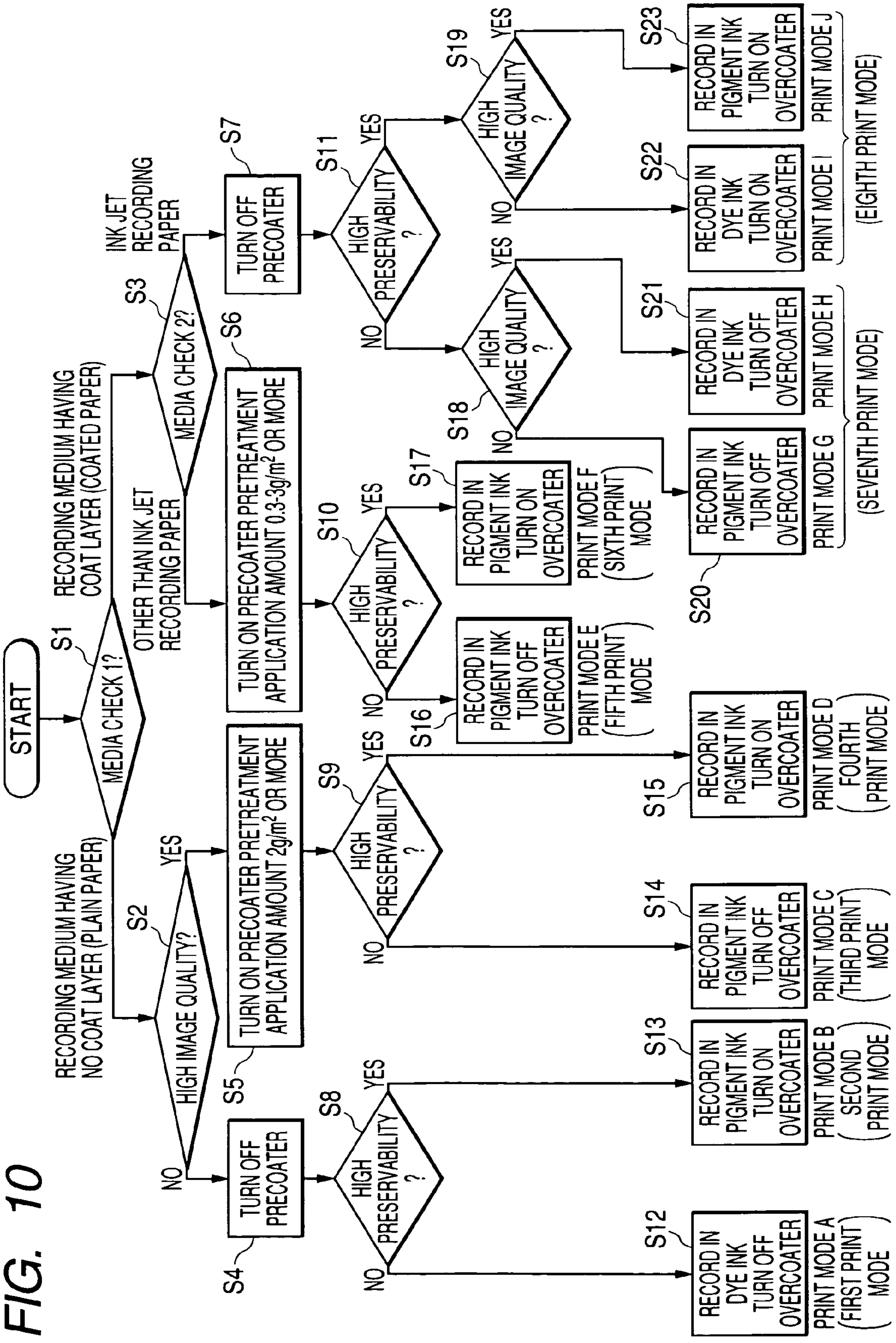
FIG. 10 is a flowchart to show a flow of processing performed in the ink jet recording apparatus of the invention.
Figure 12:
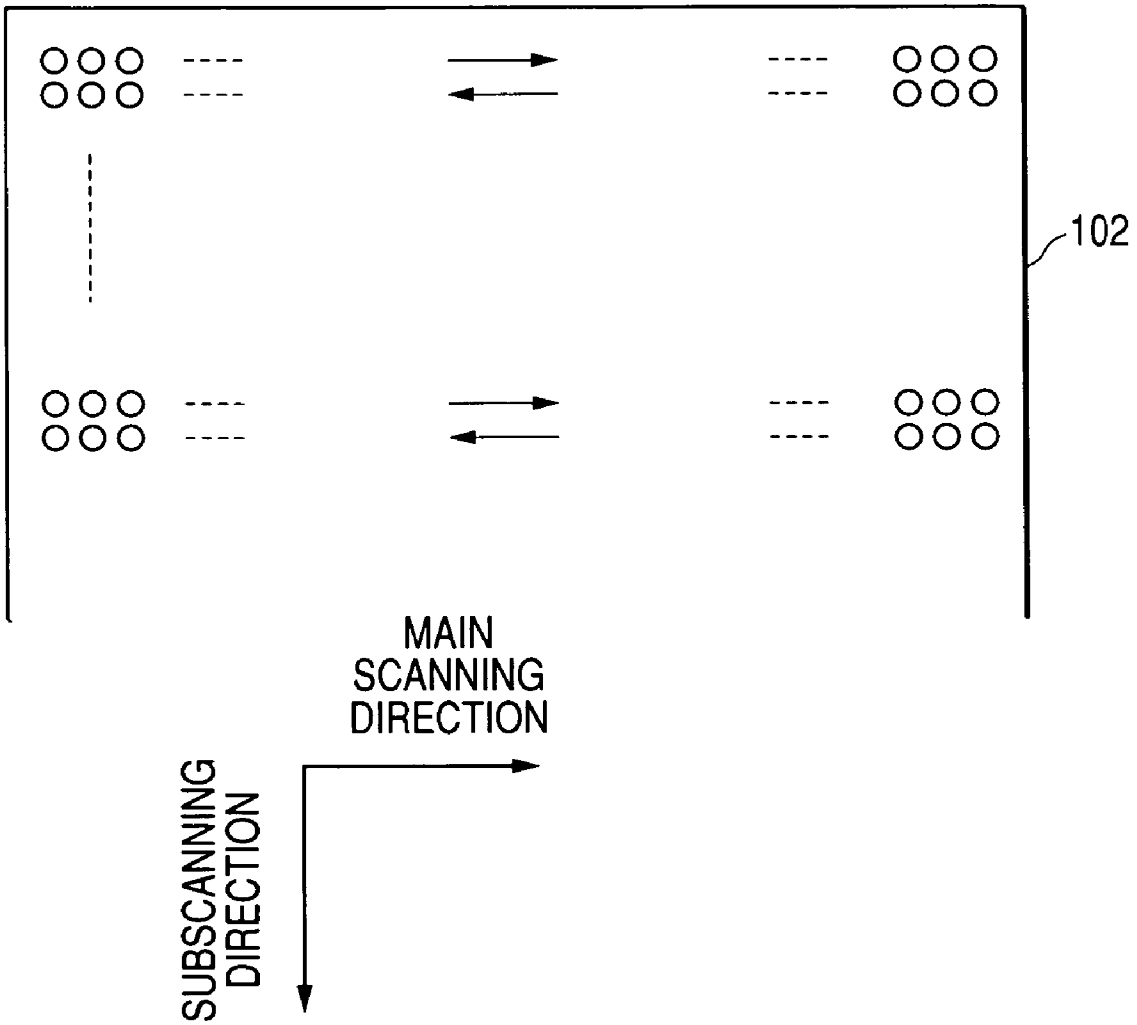
FIG. 12 is a drawing to describe the operation of the recording head in the print mode used in the invention.

An example of the record operation of the ink jet recording apparatus of the invention will be discussed more specifically with reference to FIGS. 10 and 11. FIG. 10 is a flowchart to show a flow of processing performed in the ink jet recording apparatus of the embodiment, and FIG. 11 is a schematic representation of the print mode table according to the embodiment.

The embodiment is characterized in that not only the presence or absence of a coat layer, but also the type of coat layer (the presence or absence of ink jet suitability) is considered for classifying the recording media to be used and pretreatment and posttreatment are controlled in response to the recording medium thus classified and dye ink and pigment ink are used properly, whereby a record can be provided as desired by the user. The proper use (proper print) of dye ink and pigment ink can also be made by using an ink jet recording apparatus of so-called twin head type as shown in FIG. 5 and can also be made using an ink jet recording apparatus including a cartridge type recording head having integral ink tanks and changing the ink tanks whenever necessary.

In the embodiment, in addition to the characteristic signal concerning the type of recording medium, the user transmits information concerning various record characteristics of image quality, preservability, gloss, etc., required for the finally produced record (ink jet record) (record characteristic information) to the signal receiver 410 through a terminal of a host computer, etc., not shown. The selector 420 references the record characteristic information received by the signal receiver 410 and selects an appropriate print mode from among a plurality of print modes recorded in the recorder 470 (print modes A to J) based on the type of the recording medium to be used (based on the characteristic signal concerning the recording medium). This processing flow will be discussed below:

In FIG. 10, first, media check 1 for determining the type of recording medium is executed at step S1. This determination is made based on the information provided by the user through the host computer, etc., information sent from the detector, etc., not shown.

If the recording medium is a recording medium having no coat layer (plain paper) as the result of the determination at step S1, control goes to step S2 and the record characteristic information is referenced and whether or not the record characteristic information contains a print command requesting high image quality is determined. If the print command is not contained, control goes to step S4 and a mode of applying no pretreatment (precoater OFF) is selected (print mode A or B). On the other hand, if the print command is contained, control goes to step S5 and a mode of applying a coating of a pretreatment 2 $g/m^2$ or more in solid content terms (precoater ON) is selected (print mode C or D).

Thus, if plain paper is used and high image quality is not requested, precoat as a factor of an increase in cost need not be performed (step S4). On the other hand, the reason why a coating of a large amount of a pretreatment of 2 $g/m^2$ or more is applied at step S5 if plain paper is used and high image quality is requested is that plain paper generally has a high liquid holding capability and thus requires a large amount of a pretreatment to provide high color development and on the other hand, if a coating of a large amount of a pretreatment is applied, pulp fibers of plain paper internally hold the pretreatment of liquid and thus degradation of drying characteristics is not incurred and it is less feared that the paper appearance may be changed as a coating of a large amount of a pretreatment is applied.

On the other hand, if the recording medium is a recording medium having a coat layer (coated paper) as the result of the determination at step S1, control goes to step S3 and media check 2 for determining the type of coated paper is executed. This determination is made as in the media check 1 described above.

If the coated paper is any other paper than ink jet recording paper as the result of the determination at step S3, control goes to step S6 and a mode of applying a coating of a pretreatment 0.3 to 3 $g/m^2$ in solid content terms (precoater ON) is selected (print mode E or F). On the other hand, if the coated paper is ink jet recording paper, control goes to step S7 and a mode of applying no pretreatment (precoater OFF) is selected (print mode G, H, I, or J).

Thus, to use coated paper other than ink jet recording paper, precoat needs to be performed to give ink absorbency, etc., required for print (step 6); whereas, to use ink jet recording paper, ink jet recording paper is provided with an ink reception layer having ink jet suitability and thus precoat is not required (step 7). The reason why a small application amount of a pretreatment is set at step S6 as compared with that at step S5 is that general print coated paper used at step S6 has a low liquid holding capability as compared with plain paper (recording medium having no coat layer) used at step S5. That is, for the recording medium having a low liquid holding capability, a smaller amount of a pretreatment than that for the recording medium having a high liquid holding capability can provide a sufficient ink flocculation effect (high color development); on the other hand, if a coating of a large amount of a pretreatment is applied, the drying characteristics are degraded and there is a fear of incurring degradation of the image quality and production efficiency or the like and therefore the application amount of a pretreatment is limited at step S6.

After the precoater is turned off at step S4, control goes to step S8 and the record characteristic information is referenced and whether or not the record characteristic information contains a print command requesting high preservability of record is determined. If the print command is not contained, control goes to step S12 and a mode of using dye ink and using no posttreatment (overcoater OFF) is selected (print mode A). On the other hand, if the print command is contained, control goes to step S13 and a mode of using pigment ink and depositing a posttreatment on the record portion (overcoater ON) is selected (print mode B).

Thus, if plain paper is used and neither high image quality nor high preservability is requested, preferably recording is performed using dye ink without performing pretreatment or posttreatment (print mode A). As a print example to which print mode A is applied, New Year's card print using usual postal cards can be named. On the other hand, if plain paper is used and high preservability is requested although high image quality is not requested, pigment ink excellent in preservability of a record image as compared with dye ink is used and further posttreatment is performed, whereby it is made possible to meet the request for high preservability (print mode B). As a print example to which print mode B is applied, print of text documents and important documents which need to be preserved for a long term can be named.

After the precoater is turned on (application amount 2 $g/m^2$ or more) at step S5, control goes to step S9 and the record characteristic information is referenced and whether or not the record characteristic information contains a print command requesting high preservability of record is determined. If the print command is not contained, control goes to step S14 and a mode of using pigment ink and using no posttreatment (overcoater OFF) is selected (print mode C). On the other hand, if the print command is contained, control goes to step S15 and a mode of using pigment ink and depositing a posttreatment on the record portion (overcoater ON) is selected (print mode D).

The reason why pigment ink rather than dye ink is used in the print modes C and D is that the color material dye in the dye ink generally makes it hard to provide the flocculation effect (high color development) by a pretreatment of polyvalent metal salt, etc., and if the dye ink is ejected onto plain paper, feathering or bleeding easily occurs along the pulp fibers of the plain paper. In contrast, to use pigment ink, the flocculation effect of a pretreatment is sufficiently developed and an image with high color development can be formed. As a print example to which print mode C is applied, print of a record used for a short term capitalizing on the texture of paper (recording medium) can be named; for example, print of a poster for indoor exhibition is applied. The print mode D for performing posttreatment makes it possible to finish printed matter with the original texture of a recording medium left depending on the posttreatment method, and also makes it possible to produce a record with high preservability at comparatively low cost because plain paper is used. Thus, the print mode D can be applied to a wide range of print of exhibits, photo media, works of art, etc., as well as books, magazines, etc., repeatedly used.

After the precoater is turned on (application amount 0.3 to 3 $g/m^2$) at step S6, control goes to step S10 and the record characteristic information is referenced and whether or not the record characteristic information contains a print command requesting high preservability of record is determined. If the print command is not contained, control goes to step S16 and a mode of using pigment ink and using no posttreatment (overcoater OFF) is selected (print mode E). On the other hand, if the print command is contained, control goes to step S17 and a mode of using pigment ink and depositing a posttreatment on the record portion (overcoater ON) is selected (print mode F).

The reason why pigment ink rather than dye ink is used in the print modes E and F is the same as that in the print modes C and D. As a print example to which print mode E is applied, print of a record used for a short term capitalizing on white and firmness of paper (recording medium) can be named as with the print mode C; for example, print of a poster for indoor exhibition and advertising representation is applied. Like the print mode D, the print mode F can be applied to a wide range of print of exhibits, photo media, works of art, etc., as well as books, magazines, etc., repeatedly used.

After the precoater is turned off at step S7, control goes to step S11 and the record characteristic information is referenced and whether or not the record characteristic information contains a print command requesting high preservability of record is determined. If the print command is not contained, control goes to step S18 and further whether or not the record characteristic information contains a print command requesting high image quality is determined. If high image quality is not requested, control goes to step S20 and a mode of using pigment ink and using no posttreatment (overcoater OFF) is selected (print mode G). On the other hand, if high image quality is requested, control goes to step S21 and a mode of using dye ink and using no posttreatment (overcoater OFF) is selected (print mode H).

In the print mode G, basically pigment ink is proper as ink as described above, but dye ink can also be used and the user may select pigment ink or dye ink appropriately according to the type of ink jet recording paper, for example, so-called absorption type or swelling type.

On the other hand, if the record characteristic information contains a print command requesting high preservability of record at step S11, control goes to step S19 and further whether or not the record characteristic information contains a print command requesting high image quality is determined. If high image quality is not requested, control goes to step S22 and a mode of using dye ink and depositing a posttreatment on the record portion (overcoater ON) is selected (print mode I). On the other hand, if high image quality is requested, control goes to step S23 and a mode of using pigment ink and depositing a posttreatment on the record portion (overcoater ON) is selected (print mode J).

The print modes G and H correspond to the general use mode of a usual ink jet printer widespread mainly on the consumable market. The print modes I and J are applied to such a case where film-photo-tinted print is executed, for example. The proper use of the print modes G and H and the proper use of the print modes I and J are each made in response to the requested image quality level.

By the way, in the print modes G to J applied to ink jet recording paper, if the overcoater is turned off, dye ink is used as output ink of a high-quality image (print mode H); whereas, if the overcoater is turned on, pigment ink is used as output ink of a high-quality image (print mode J). Pigment ink or dye ink is used in response to the presence or absence of overcoat, because pigment ink and dye ink differ largely in provided record image characteristics.

That is, a record image provided in pigment ink (pigment ink image) is formed by color development of color material particles (pigment) left on the recording medium and has disadvantages in that irregular reflection of incident light caused by the color material particles easily occurs and image quality is easily degraded because of the tint difference or degradation of color development property if no overcoat is applied. In contrast, for a record image provided in dye ink (dye ink image), color material particles (dye) are not left on the recording medium and percolate through the inside of the recording medium and dye the surface layer portion, thereby developing color and therefore irregular reflection of incident light is hard to occur and if no overcoat is applied, the image density is sufficiently high. If overcoat is applied to such a dye ink image, the dyed surface layer portion in the produced coated record is positioned inside rather than on the surface layer of the record and thus the image density is lowered, resulting in degradation of the image quality.

Therefore, if high preservability is not requested and the overcoater is turned off, preferably dye ink is used to meet the request for high image quality (print mode H) and if high preservability is requested and the overcoater is turned on, preferably pigment ink is used to meet the request for high image quality (print mode J).

The operation relationship between the recording head 250 and the recording medium 102 will be discussed below:

Referring again to FIG. 2, the ink jet recording apparatus 100 according to the invention reciprocates the carriage 220 in the main scanning direction indicated by arrow D, drives the recording head 250 for ejecting treatment liquid and color ink, rotates the platen 200 in the C direction of the subscanning direction by a paper feed motor not shown for transporting a recording medium, and forms multicolor text, image, etc., on the recording medium.

The main scanning drive section 450 in FIG. 8, the functional block diagram of the ink jet recording apparatus according to the invention is implemented as a feed mechanism of the carriage 220, and the subscanning drive section 460 is implemented as a feed mechanism of the recording medium 102.

The operation relationship between the recording head 250 and the recording medium 102 when pretreatment liquid, ink, and posttreatment liquid are ejected in order onto a recording medium having no coat layer in the print modes according to the invention will be discussed below by way of example:

One form of the operation relationship according to the invention will be discussed with the recording head 250 including the pretreatment liquid head 253, the ink print head 251, and the posttreatment liquid head 255 formed in one piece shown in FIG. 4A. The pretreatment liquid, ink, and posttreatment liquid can be consecutively operated and applied onto the recording medium in this order in conjunction with motion of the recording head 250.

Specifically, while the recording head 250 is moved in the main scanning direction from one end part of the recording medium 102 to an opposite end part along the arrow D direction shown in FIG. 2, the pretreatment liquid, ink, and posttreatment liquid are consecutively ejected in order for printing. After this, the recording medium 102 is moved by the feed mechanism as much as the print area corresponding to the subscanning direction of the recording head 250 in the subscanning direction indicated by the arrow shown in FIG. 2. After this, while the recording head 250 is moved in the main scanning direction from the opposite end part of the recording medium 102 to the one end part, the pretreatment liquid, ink, and posttreatment liquid are consecutively ejected in order for printing. This sequence is repeated, whereby it is made possible to form a record on the recording medium. Preferably, the ink is color ink including yellow, magenta, cyan, and black.

Another form of the operation relationship according to the invention will be discussed with the recording head 250 including the pretreatment liquid head 253, the ink print head 251, and the posttreatment liquid head 255 formed separately shown in FIG. 4B.

The selector 420 of the drive controller 430 selects the pretreatment liquid head 253 based on the signal corresponding to the recording medium having no coat layer, received by the signal receiver 410. If the pretreatment head 253 is selected, the main scanning drive section 450 moves the pretreatment head 253 from one end part of the start position, of a recordable area of the recording medium to another end part, and pretreatment liquid is ejected onto the recording medium corresponding to the area where later ink is to be ejected. Next, the recording medium is fed in the subscanning direction as much as the print area corresponding to the subscanning direction of the head 253, and the pretreatment liquid head 253 is once reciprocated. After this, the above-described reciprocating of the pretreatment liquid head 253 is consecutively executed and pretreatment liquid is ejected onto the recording medium. Ejecting of the pretreatment liquid onto the recording medium is not limited to the area where later ink is to be ejected and can also be executed for the full face of the recording medium. After this, the recording medium 102 is returned to the former start position.

After the pretreatment liquid is ejected, the recording medium is dried by a heater not shown in FIG. 2 as required.

Next, the selector 420 selects the ink print head 251 and following the pretreatment head 253, the ink print head 251 is moved like the operation of the pretreatment head 253 and is made to eject ink onto the area to which the pretreatment liquid is already applied. At the time, preferably the ink head is a head for color ink including yellow, magenta, cyan, and black.

After the ink is ejected, the recording medium can also be dried by the heater as required.

Then, the recording medium 102 is returned to the start position, as described above. The posttreatment head 255 is selected by the selector 420 and is moved and is made to eject posttreatment liquid onto the ink ejection portion or the full face of the recording medium as the pretreatment head 253 is operated.

The method of controlling the operation of the heads 251, 253, and 255 so as to select the pretreatment liquid head 253, the ink print head 251, and the posttreatment liquid head 255 and eject pretreatment liquid, ink, and posttreatment liquid in order onto the recording medium having no coat layer has been described. Ejection of the posttreatment liquid can also be skipped as the print mode is set so.

Likewise, the operation of the heads 251, 253, and 255 is controlled so as to select the pretreatment liquid head 253, the ink print head 251, and the pretreatment liquid head 255 in this order and eject pretreatment liquid, ink, and postreatment liquid in order onto the recording medium having a coat layer. It is also possible to skip ejection of the pretreatment liquid or the and eject only the posttreatment liquid as required.

The description has been given with the head including the precoater 253 and the overcoater 255 using electromechanical transducing elements, but the means 253 and 255 are not limited to them. As other specific examples of the precoater 253, a spray for ejecting liquid, a spreader roller for applying a coat of liquid, and the like that can be understood by those skilled in the art can be named. As other specific examples of the overcoater 255, a pressure roller for pressing and bonding a transparent film, a thermal head and a heat roller for thermally transferring a transfer layer (for example, a thermoplastic resin layer) previously formed on a support (see FIGS. 6 and 7), and the like can be named in addition to the specific examples of the precoater.

The invention can be applied not only to recording media like a cut sheet as shown in FIG. 1, but also to recording media like a continuous sheet such as roll paper. Various known components for handling roll paper in an ink jet recording apparatus compatible with roll paper, for example, a holder for holding roll paper, a paper feeder, a cutter, and the like can be used whenever necessary.

To use any other means than the above-described head, the means is placed in the ink jet recording apparatus 100 according to the invention, whereby the object of the invention can be accomplished.

INDUSTRIAL APPLICABILITY

According to the invention, a single ink jet recording apparatus makes it possible to select pretreatment, ink jet record, posttreatment and execute any desired record for a recording medium having no coat layer and a recording medium having a coat layer, and can provide record with compatibility between high image quality and high preservability on each type of recording medium.

The invention claimed is:

1. An ink jet recording apparatus, for ejecting ink onto a recording medium, comprising:

(1) a precoater for applying a coat of a pretreatment;

(2) an ejector for ejecting the ink;

(3) an overcoater for at least depositing a posttreatment on the ink;

(4) a recorder recording print modes corresponding to types of recording medium;

(5) a selector for selecting one of the print modes from said recorder based on the type of the recording medium; and (6) a drive controller for controlling the operation of said precoater, said ejector, and said overcoater based on the selection result; and (7) a signal receiver for receiving record characteristic information concerning various record characteristics required for a record, wherein said selector references the record characteristic information received by the signal receiver and selects an appropriate print mode from said recorder based on the type of the recording medium to be used; and wherein the following print modes are recorded in said recorder:

1) First print mode: A coat of the pretreatment is not applied and dye ink is ejected for recording and the posttreatment is not used;

2) Second print mode: A coat of the pretreatment is not applied and pigment ink is ejected for recording and further the posttreatment is deposited on the record portion;

3) Third print mode: A coat of the pretreatment is applied 2 $g/m^2$ or more in solid content terms and then pigment ink is ejected for recording and the posttreatment is not used;

4) Fourth print mode: A coat of the pretreatment is applied 2 $g/m^2$ or more in solid content terms and then pigment ink is ejected for recording and further the posttreatment is deposited on the record portion;

5) Fifth print mode: A coat of the pretreatment is applied 0.3 to 3 g/m$^2$ in solid content terms and then pigment ink is ejected for recording and the posttreatment is not used;

6) Sixth print mode: A coat of the pretreatment is applied 0.3 to 3 g/m$^2$ in solid content terms and then pigment ink is ejected for recording and further the posttreatment is deposited on the record portion;

7) Seventh print mode: A coat of the pretreatment is not applied and dye ink or pigment ink is ejected for recording and the posttreatment is not used;

8) Eighth print mode: A coat of the pretreatment is not applied and dye ink or pigment ink is ejected for recording and further the posttreatment is deposited on the record portion.

2. The ink jet recording apparatus as claimed in claim 1 wherein the types of recording medium include a recording medium having a coat layer and a recording medium having no coat layer.

3. The ink jet recording apparatus as claimed in claim 1 wherein said precoater is a head or a spray for ejecting liquid or a roller for applying a coat of liquid.

4. The ink jet recording apparatus as claimed in claim 1 wherein said overcoater is selected from the group consisting of a head or a spray for ejecting liquid, a spreader roller for applying a coat of liquid, a pressure roller for pressing and bonding a transparent film, and a thermal head or a heat roller for thermally transferring a transfer layer previously formed on a support.

5. The ink jet recording apparatus as claimed in claim 1 wherein if an image is previously formed on the recording medium, said drive controller controls the operation of said overcoater so as to deposit a posttreatment.

6. The ink jet recording apparatus as claimed in claim 1 further comprising a heater for heating and drying the pretreatment, the ink, and the posttreatment in a single step or a plurality of steps as required after the pretreatment, the ink, and the posttreatment are applied onto or deposited on the recording medium.

7. The ink jet recording apparatus as claimed in claim 1 wherein the color material of the ink is pigment ink including at least four colors of yellow, magenta, cyan, and black.

8. The ink jet recording apparatus as claimed in claim 1 wherein the pretreatment is an ink reception layer formation material or a material for flocculating the pigment ink.

9. The ink jet recording apparatus as claimed in claim 1 wherein if the recording medium is a recording medium having no coat layer, said selector selects any of the first, second, third, or fourth print mode and if the recording medium is a recording medium having a coat layer, said selector selects any of the fifth, sixth, seventh, or eighth print mode.

10. The ink jet recording apparatus as claimed in claim 9 wherein if the recording medium is a recording medium having no coat layer, said selector selects any of the first, second, third, or fourth print mode according to [1] to [3] described below:

[1] if the record characteristic information contains a print command requesting high image quality, selecting the third or fourth print mode; if the record characteristic information does not contain the print command, selecting the first or second print mode;

[2] in the third and fourth print modes, if the record characteristic information contains a print command requesting high preservability, selecting the fourth print mode;

[3] in the first and second print modes, if the record characteristic information contains a print command requesting high preservability, selecting the second print mode.

11. The ink jet recording apparatus as claimed in claim 9 wherein if the recording medium is a recording medium having a coat layer, said selector selects any of the fifth, sixth, seventh, or eighth print mode according to [4] to [8] described below:

[4] if the recording medium is ink jet recording paper, selecting the seventh or eighth print mode; if the recording medium is not ink jet recording paper, selecting the fifth or sixth print mode;

[5] in the seventh and eighth print modes, if the record characteristic information contains a print command requesting high preservability, selecting the eighth print mode;

[6] in the fifth and sixth print modes, if the record characteristic information contains a print command requesting high preservability, selecting the sixth print mode;

[7] when the seventh print mode is selected, if the record characteristic information contains a print command requesting high image quality, ejecting dye ink for recording;

[8] when the eighth print mode is selected, if the record characteristic information contains a print command requesting high image quality, ejecting pigment ink for recording.

12. A recording method of an ink jet recording apparatus, for ejecting ink onto a recording medium comprising a precoater for applying a coat of a pretreatment, an ejector for ejecting ink, an overcoater for at least depositing a posttreatment on the ink, and a controller for controlling the operation of the precoater, the ejector, and the overcoater, said recording method comprising:

(1) the step of receiving a characteristic signal corresponding to the type of recording medium;

(2) the step of selecting which of the pretreatment, the ink, and the posttreatment is to be applied or deposited based on the signal; and (3) the step of controlling so as to apply or deposit any of the pretreatment, the ink, or the posttreatment onto or on the recording medium in response to the selection result, wherein if a characteristic signal indicating that the recording medium is a recording medium having no coat layer is received in said step (1), said steps (2) and (3) are executed according to any of print modes 1 to 4 described below and if a characteristic signal indicating that the recording medium is a recording medium having a coat layer is received in said step (1), said steps (2) and (3) are executed according to any of print modes 5 to 8 described below:

1) First print mode: A coat of the pretreatment is not applied and dye ink is ejected for recording and the posttreatment is not used;

2) Second print mode: A coat of the pretreatment is not applied and pigment ink is ejected for recording and further the posttreatment is deposited on the record portion;

3) Third print mode: A coat of the pretreatment is applied 2 $g/m^2$ or more in solid content terms and then pigment ink is ejected for recording and the posttreatment is not used;

4) Fourth print mode: A coat of the pretreatment is applied 2 $g/m^2$ or more in solid content terms and then pigment ink is ejected for recording and further the posttreatment is deposited on the record portion;

5) Fifth print mode: A coat of the pretreatment is applied 0.3 to 3 $g/m^2$ in solid content terms and then pigment ink is ejected for recording and the posttreatment is not used;

6) Sixth print mode: A coat of the pretreatment is applied 0.3 to 3 $g/m^2$ in solid content terms and then pigment ink is ejected for recording and further the posttreatment is deposited on the record portion;

7) Seventh print mode: A coat of the pretreatment is not applied and dye ink or pigment ink is ejected for recording and the posttreatment is not used;

8) Eighth print mode: A coat of the pretreatment is not applied and dye ink or pigment ink is ejected for recording and further the posttreatment is deposited on the record portion.

13. The recording method as claimed in claim 12 wherein the types of recording medium include a recording medium having a coat layer and a recording medium having no coat layer.

14. The recording method as claimed in claim 12 wherein the precoater is a head or a spray for ejecting liquid or a roller for applying a coat of liquid.

15. The recording method as claimed in claim 12 wherein the overcoater is selected from the group consisting of a head or a spray for ejecting liquid, a spreader roller for applying a coat of liquid, a pressure roller for pressing and bonding a transparent film, and a thermal head or a heat roller for thermally transferring a transfer layer previously formed on a support.

16. The recording method as claimed in claim 12 wherein if an image is previously formed on the recording medium, a posttreatment is deposited in said step (3).

17. The recording method as claimed in claim 12 further comprising the heating step of heating and drying the pretreatment, the ink, and the posttreatment in a single step or a plurality of steps as required after the pretreatment, the ink, and the posttreatment are applied onto or deposited on the recording medium.

18. The recording method as claimed in claim 12 wherein the color material of the ink is pigment ink including at least four colors of yellow, magenta, cyan, and black.

19. The recording method as claimed in claim 12 wherein the pretreatment is an ink reception layer formation material or a material for flocculating a pigment ink.

20. The recording method as claimed in claim 12 wherein if a characteristic signal indicating that the recording medium is a recording medium having no coat layer is received in said step (1), said steps (2) and (3) are executed according to [1] to [3] described below:

[1] if a request for a record of high image quality is made, selecting the third or fourth print mode; if a request for a record of high image quality is not made, selecting the first or second print mode;

[2] in the third and fourth print modes, if a request for a record of high preservability is made, selecting the fourth print mode;

[3] in the first and second print modes, if a request for a record of high preservability is made, selecting the second print mode.

21. The recording method as claimed in claim 12 wherein if a characteristic signal indicating that the recording medium is a recording medium having a coat layer is received in said step (1), said steps (2) and (3) are executed according to [4] to [8] described below:

[4] if the recording medium is ink jet recording paper, selecting the seventh or eighth print mode; if the recording medium is not ink jet recording paper, selecting the fifth or sixth print mode;

[5] in the seventh and eighth print modes, if a request for a record of high preservability is made, selecting the eighth print mode;

[6] in the fifth and sixth print modes, if a request for a record of high preservability is made, selecting the sixth print mode;

[7] when the seventh print mode is selected, if a request for a record of high image quality is made, ejecting the dye ink for recording;

[8] when the eighth print mode is selected, if a request for a record of high image quality is made, ejecting the pigment ink for recording.

22. An ink jet record provided by the recording method as claimed in claim 12.

* * * * *